Figure 1:
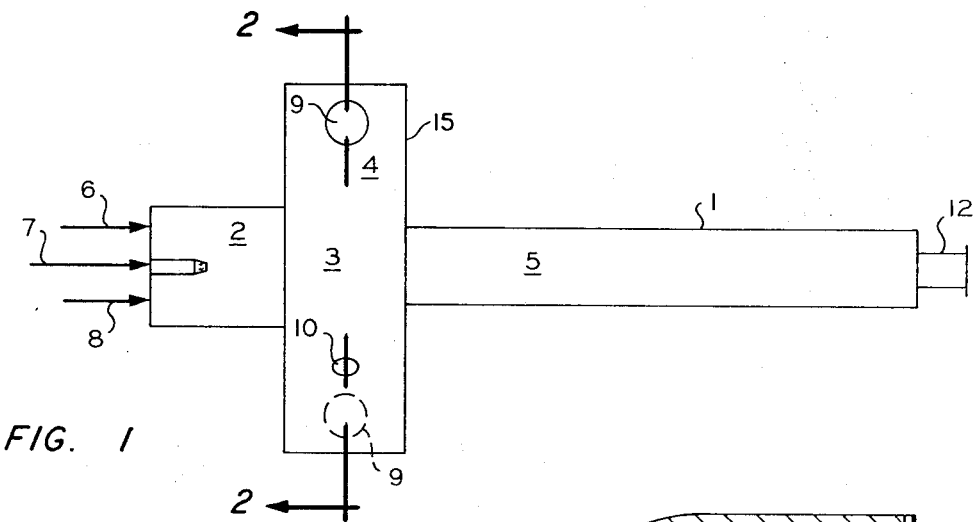

United States Patent

[11] 3,615,208

| [72] | Inventor | John W. Byron |
| | | Borger, Tex. |
| [21] | Appl. No. | 797,212 |
| [22] | Filed | Feb. 6, 1969 |
| [45] | Patented | Oct. 26, 1971 |
| [73] | Assignee | Phillips Petroleum Company |
| | | Bartlesville, Oklahoma |

[54] METHOD AND APPARATUS FOR CARBON BLACK PRODUCTION
5 Claims, 4 Drawing Figs.

[52] U.S. Cl............................................. 23/209.4,
209.6, 259.5, 277; 55/1, 428, 466
[51] Int. Cl.............................................. C 09c 1/50
[50] Field of Search................................... 23/209.4,
209.6, 259.5, 277; 55/428, 466, 1

[56] References Cited

UNITED STATES PATENTS

| 2,346,005 | 4/1944 | Bryson..................... | 55/457X |
| 2,805,131 | 9/1957 | McIntire................... | 23/209.4 |
| 2,892,684 | 6/1959 | King......................... | 23/209.6 |
| 2,961,300 | 11/1960 | Dollinger................. | 23/209.4 |
| 3,235,343 | 2/1966 | Riggins.................... | 23/288 |
| 3,475,125 | 10/1969 | Krejci...................... | 23/209.4 |

*Primary Examiner* — Edward J. Meros
*Attorneys* — Young and Quigg

ABSTRACT: Removal of grit from the gaseous mass in a carbon black furnace by passing the gaseous mass over a radial port or depression in the wall of the lower periphery of the furnace thereby entrapping the grit which is thereafter removed by means of a draw-off conduit.

PATENTED OCT 26 1971 3,615,208

INVENTOR.
J. W. BYRON
BY
Young & Quigg
ATTORNEYS

METHOD AND APPARATUS FOR CARBON BLACK PRODUCTION

This invention pertains to carbon black reactors.

In one of its more specific aspects, this invention relates to a carbon black furnace reactor which produces a high quality carbon black.

In furnace black processes, the carbon black is produced at elevated temperatures within a reactor which is usually refractory lined. During the course of the process, carbon black exists in a mass of hot gases moving at high velocities.

The refractory lining of the reactor spalls for a number of reasons including contact of these high velocity materials at the elevated temperatures involved. Such spalling produces minute refractory particles which become included in that material passing through the reactor and these particles, known as "grit," act further in attrition of the refractory. This grit eventually is included in the carbon black product wherein its presence is undesirable.

There has now been developed a carbon black furnace and process which facilitates the removal of grit during the course of the reaction. According to this invention there is provided a carbon black reactor having means for entrapping grit and means for expelling grit from the reactor.

In one of its embodiments, this invention involves a horizontal reactor having entrapping means positioned in one of its lower quadrants.

In another embodiment, this invention involves a reactor employing a plurality of optionally-positioned means for entrapping and removing grit.

There is also provided a method of removing grit from a carbon black reactor which comprises entrapping said grit within a depression within said reaction zone and decreasing the pressure downstream of said entrapped grit to cause said grit to move from said entrapment to the exterior of the reaction zone.

Accordingly, it is an object of this invention to provide a carbon black reactor which produces a high quality black of reduced grit content.

It is another object of this invention to provide a carbon black reactor which permits removal of grit from its carbon black product thus realizing improved refractory life.

Figure 2:
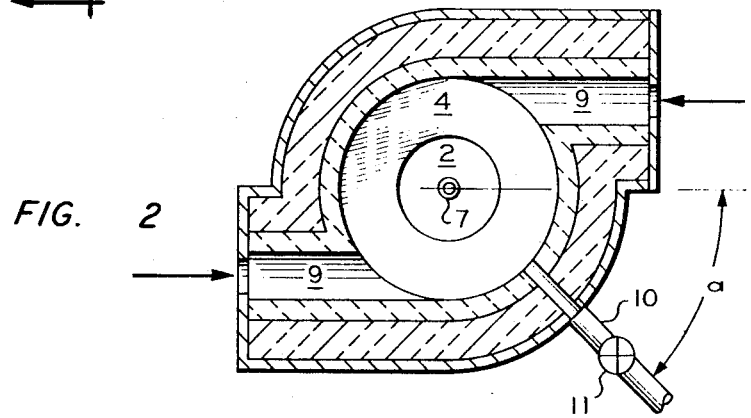

The apparatus of this invention will be more easily understood when explained in conjunction with the attached drawings in which FIG. 1 indicates schematically one embodiment of this invention in elevation in a reactor of specified configuration, FIG. 2 is a cross-sectional view of the reactor shown in FIG. 1 through section 2—2.

Figure 3:
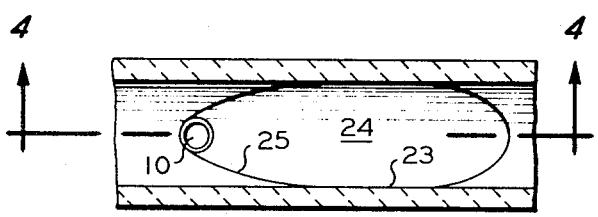
Figure 4:
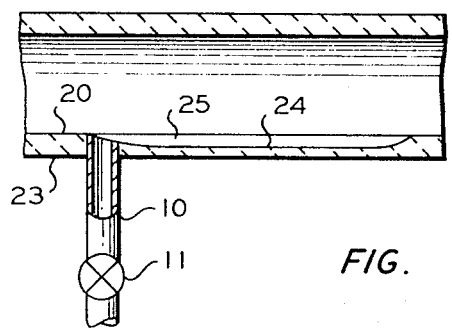

FIG. 3 is a plan view of this invention in a reactor of a different configuration, and FIG. 4 is a view in elevation of the reactor of FIG. 3.

The means and method of this invention are applicable to any horizontal carbon black reactor of any configuration and to any of the many processing conditions for the production of carbon black. While certain reactor configurations may be referred to in the explanation of the invention, these are exemplary and are not meant to limit the scope of the invention.

Referring now to FIG. 1, there is shown in outline the internal configuration of an axial type reactor 1 having axial zone 2, combustion zone 3, precombustion zone 4, and reaction zone 5. Axial zone 2 is fitted with conduits 6, 7 and 8 through which the various reactants are introduced and precombustion zone 4 is fitted with ports 9 through which additional quantities of reactants can be introduced.

In the preferred configuration of this reactor, the diameter of combustion zone 3 is greater than the diameter of reaction zone 5. In the operation of this reactor, introduction of reactants into precombustion zone 4 by ports 9 and from precombustion zone 4 into combustion zone 3 is frequently made in such a manner as to produce a helical flow pattern of reactants from combustion zone 3 to nozzle 12 at which point carbon black is removed from the reactor. Accordingly, a variety of flow patterns will generally exist within the reactor. Since the greatest rotational velocity seemingly exists within the region of the precombustion zone 4 and combustion zone 3 and because of the reduction in reactor diameter at this point upon entrance into zone 5, it has been found that maximum refractory spalling occurs against the downstream wall 15 of combustion zones 3 and precombustion zone 4. Spalling also occurs in other areas of the precombustion zone 4 and combustion zone 3. There is a centrifugal force exerted on the particles in these zones which causes them to travel around the inner periphery of the precombustion zone. Conduit 10 is located in one of the lower quadrants of the precombustion zone 4 so as to discharge downwardly from the precombustion zone at a locus opposite the lower inlet of port 9 at a locus from an angle $a$ (see FIG. 2) of about 25° to 85°, preferably at a locus from about 35° to 45° from the horizontal diameter of the reaction zone.

Hence, at a point within this vicinity, and in one of the lower quadrants of the reactor when viewed in elevational cross section perpendicular to the longitudinal center line of the reactor, there is installed draw-off conduit 10 including closure means, or valve 11. Conduit 10 provides a radial port in which grit is entrapped and accumulated. Inasmuch as the furnace process is generally conducted under a pressure above atmospheric, opening of valve 11 serves to pressure-remove the accumulated grit from the reactor. Valve 11, preferably, is opened intermittently.

In respect to its positioning along the longitudinal axis of the precombustion chamber, it is preferable that port 10 be located on the vertical center line of the ports 9. However, positioning at any place along the length of the longitudinal axis is satisfactory, the effectiveness tending to diminish as the location of port 10 approaches the vertical wall 15 of precombustion zone 4.

In one embodiment of this invention, the refractory proximate the port is shaped to facilitate the collection of the grit. Such shaping is particularly effective in carbon black furnaces of substantially uniform diameter or of those not possessing adjacent zones of substantially different diameters in which a wall can be used to contribute to the entrapment of the particles in the port. Such an embodiment is, of course, also employable in the reactor previously discussed.

This embodiment, in a reactor of uniform diameter, is illustrated in FIG. 3 in plan and FIG. 4 in elevation in which port 10 extends through refractory 23. In the lower section of the reactor, there is formed in refractory 23, a depressed area or zone 24 which is, for example, generally parabolic in plan view and which forms elevated edge 25, against which that particulate matter being swept along the reactor impinges and is directed therealong into port 10.

As shown in FIG. 4, this depressed area 24 appears in elevation to resemble, for example, a catenary in configuration, with port 10 being positioned to collect that grit devolved along the area to its apex.

While depressions of this plan and elevation are such as to minimize the establishment of undesirable flow patterns of the reactants within the reactor while facilitating the collection of particles, depressions of any suitable configuration can be employed. Similarly while the depression at the apex of which port 10 is preferably positioned may be of any configuration, it is desirable that it gradually terminate at port 10 and be of regularity in its shape in order to minimize further spalling of the refractory surfaces in which it formed. The depression can be formed such that flow through it to accumulating port 10 is either parallel or perpendicular to the longitudinal axis of the reactor or at any intermediate orientation.

In removing entrapped grit from accumulation port 10, valve 11 is opened, the grit expelled and valve 11 closed, with port 10 being allowed to accumulate grit until the next removal.

It will be evident that a plurality of such grit-removal means can be supplied. Preferably, there will be at least one positioned near the inlet of reaction zone 5, with one or more means being positioned thereafter along the length of zone 5. In this manner, the attrition-effect of that first-formed grit is minimized with that grit formed in those areas subsequent to the entrance of the reactant mass into the reaction zone being removed from the carbon black prior to its removal from the reactor.

In light of the above disclosure, certain modifications may be suggested. However, such are considered as being within the scope of the invention.

The use of the method and apparatus of this invention has been found quite effective in preventing the inclusion of grit within the carbon black product. The following examples illustrate the effectiveness of the invention:

EXAMPLE

| Runs | Weight Percent Grit in Carbon Black Product |
|---|---|
| Operating Without Grit Removal | 0.030 |
| Operating With Grit Removal | 0.005 |

That which is claimed is:

1. A method of recovering substantially grit-free carbon black from a horizontally-positioned carbon black reactor in which said carbon black is produced in a gaseous mass containing grit which comprises passing said gaseous mass over a depression formed in the wall of the lower periphery of the reaction zone of said reactor to entrap said grit in said depression, said depression being of parabolic configuration in plane view and having outlet conduit means positioned proximate its downstream end, removing the entrapped grit from said reactor through said outlet conduit means and recovering the substantially grit-free carbon black.

2. The method of claim 1 in which said grit is removed intermittently.

3. The method of claim 1 in which said grit is entrapped in a plurality of said depressions.

4. In a horizontally-positioned carbon black reactor adapted with conduit means for introducing reactants thereinto and with a reaction zone adapted with conduit means for the removal of carbon black from said reactor, the improvement comprising grit removal means comprising a depression formed in the wall of the lower periphery of said reaction zone, said depression being of parabolic configuration in plane view and having outlet conduit means positioned proximate its downstream end adapted to provide open communication between said depression and the exterior of said reactor.

5. The apparatus of claim 4 in which said carbon black reactor is adapted with an interior refractory lining and said grit entrapment means comprises a depression formed in the interior surface of said lining.